United States Patent
Doppler et al.

(10) Patent No.: US 11,204,080 B2
(45) Date of Patent: Dec. 21, 2021

(54) ACTUATOR AND METHOD FOR SWITCHING OFF AN ACTUATOR

(71) Applicant: Aktiebolaget SKF, Gothenburg (SE)

(72) Inventors: Manuel Doppler, Wehr (DE); Marcel Soltermann, Sankt Pantaleon (CH); Cyrill Baur, Schwerzenbach (CH); Johannes Federer, Winterthur (CH)

(73) Assignee: Aktiebolaget SKF, Gothenburg (SE)

( * ) Notice: Subject to any disclaimer, the term of this patent is extended or adjusted under 35 U.S.C. 154(b) by 220 days.

(21) Appl. No.: 15/890,715

(22) Filed: Feb. 7, 2018

(65) Prior Publication Data

US 2018/0266529 A1 Sep. 20, 2018

(30) Foreign Application Priority Data

Mar. 17, 2017 (DE) .......................... 102017204470.5

(51) Int. Cl.
*F16H 25/20* (2006.01)

(52) U.S. Cl.
CPC ... *F16H 25/2015* (2013.01); *F16H 2025/209* (2013.01); *F16H 2025/2031* (2013.01)

(58) Field of Classification Search
CPC ......... F16H 25/2015; F16H 2025/2031; F16H 2025/209; F16H 25/2006; F16H 25/2021; A61G 13/02; A61H 13/04; A61H 13/06; A61H 13/08
USPC ...................................................... 74/89.34
See application file for complete search history.

(56) References Cited

U.S. PATENT DOCUMENTS

| | | | | |
|---|---|---|---|---|
| 2,385,194 A * | 9/1945 | Carroll | ...................... | F16H 1/16 74/441 |
| 2,417,434 A * | 3/1947 | Mead | .................. | F16H 25/2015 192/143 |
| 4,295,017 A * | 10/1981 | Kashima | ................ | H01H 13/20 200/330 |
| 7,402,966 B2 * | 7/2008 | Bellingroth | ......... | F16H 25/2015 318/135 |
| 8,800,983 B2 * | 8/2014 | Koch | ..................... | A61G 13/02 248/652 |
| 9,333,469 B2 * | 5/2016 | Brinker | ................... | B01F 7/161 |
| 9,408,466 B2 * | 8/2016 | Flamme | ............... | A47C 1/0242 |

(Continued)

FOREIGN PATENT DOCUMENTS

WO WO-0201588 A1 * 1/2002 ........... H01H 19/186

*Primary Examiner* — Jake Cook
*Assistant Examiner* — Gregory Robert Weber
(74) *Attorney, Agent, or Firm* — Laurence A. Greenberg; Werner H. Stemer; Ralph E. Locher

(57) ABSTRACT

An actuator includes at least one threaded spindle, at least one switch, at least one actuating element configured to actuate the switch, and at least one housing relative to which the threaded spindle is movable. The actuating element is attached to the housing. The housing may include at least one wall extending circumferentially around the threaded spindle and a first axial end wall and a second axial end wall, and the threaded spindle may pass through the first and second axial end walls. The first axial end wall may overlie the at least one switch, and a first end of the at least one actuating element may be connected to the housing and a second end of the at least one actuating element may extend between the at least one switch and the first axial end wall.

14 Claims, 1 Drawing Sheet

(56) References Cited

U.S. PATENT DOCUMENTS

2015/0289665 A1\* 10/2015 Klimm .................... F16H 19/04
74/89.14

\* cited by examiner

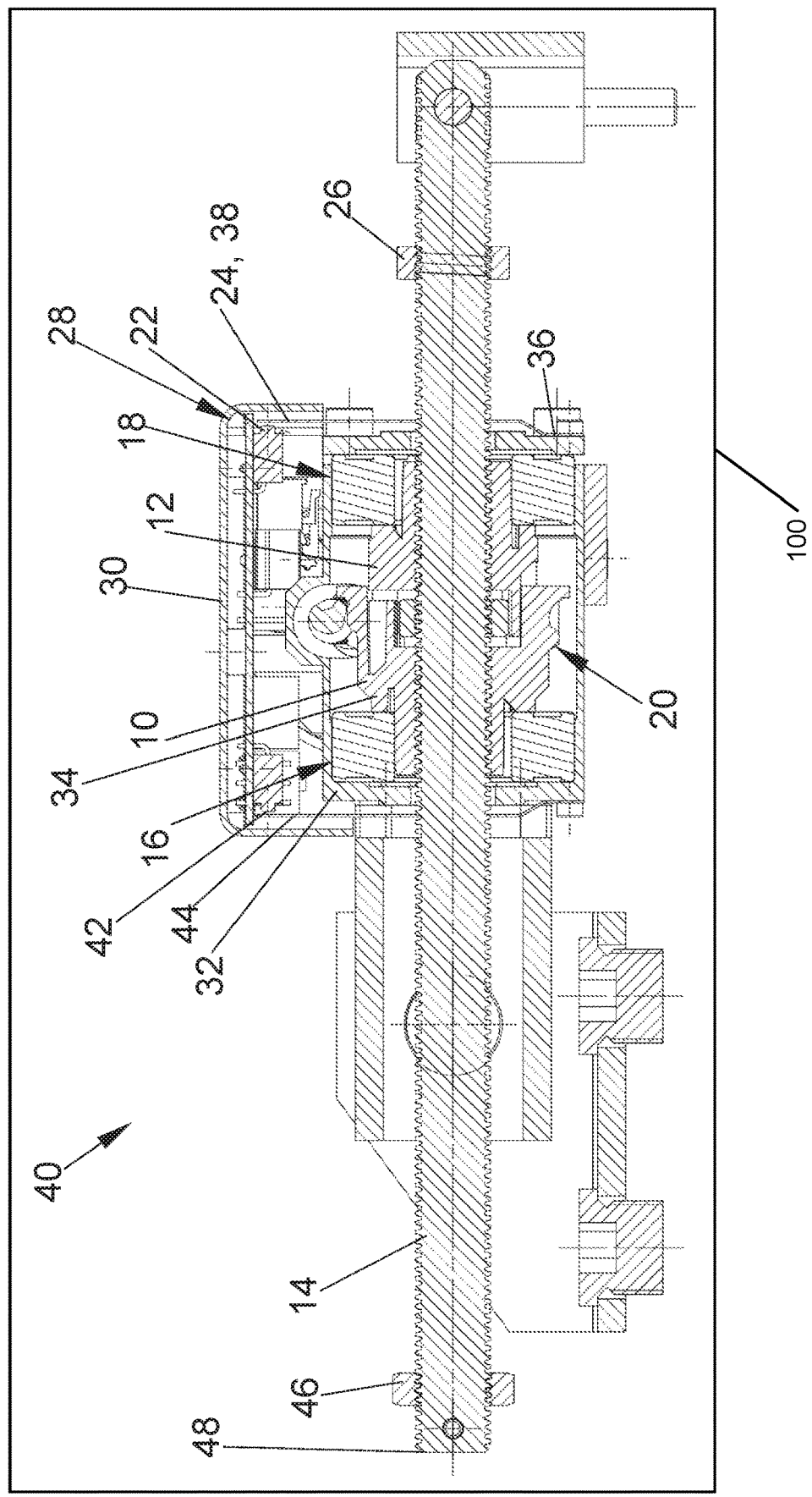

ACTUATOR AND METHOD FOR
SWITCHING OFF AN ACTUATOR

CROSS-REFERENCE

This application claims priority to German patent application no. 10 2017 204 470.5 filed on Mar. 17, 2017, the contents of which are fully incorporated herein by reference.

TECHNOLOGICAL FIELD

The disclosure is directed to an actuator including at least one threaded spindle, at least one switch, at least one actuating element for actuating the switch, and at least one housing, relative to which the threaded spindle is movable.

BACKGROUND

An actuator is known that includes a threaded spindle, a circuit board, a bar, and a housing, relative to which the threaded spindle is movable. Furthermore, a mechanical element is screwed onto the threaded spindle, onto which mechanical element the bar is attached. If the threaded spindle is moved into an extreme position by a drive, then the bar actuates the complexly constructed circuit board, which is disposed on an outer side of the housing, whereby the drive is switched off.

Furthermore, it is known to dispose two switches for switching off an actuator drive on a housing, wherein a spindle nut of the actuator is disposed in the immediate vicinity of the threaded spindle of the actuator. Here two clamping rings are attached on opposing end regions of the threaded spindle for actuating the two switches, wherein one of the clamping rings actuates one of the switches when the threaded spindle reaches a maximum extension position relative to the spindle nut. In the described installation situation of the switches an axial extension of the subassembly that rests relative to a center of mass of the spindle nut raises the switches and includes the housing and a drive for driving the threaded spindle.

SUMMARY

An aspect of the disclosure is to provide an actuator of the above-mentioned type with an efficient design.

The disclosure is directed to an actuator including at least one threaded spindle, at least one switch, at least one actuating element, which is provided for an actuating of the switch, and at least one housing, relative to which the threaded spindle is movable.

According to the disclosure, the actuating element is attached to the housing. An efficient and in particular cost-effective, simple, and reliable design can thereby be achieved. Furthermore, in particular a compact construction and in particular a small axial dimension of a subassembly, which rests relative to a center of mass of a spindle nut and includes the housing and a drive for driving the threaded spindle, can be achieved.

Further advantages arise from the following description of the drawing. An exemplary embodiment of the invention is depicted in the drawing. The drawing, the description, and the claims contain numerous features in combination. The person skilled in the art will also advantageously consider the features individually and in further meaningful combinations.

BRIEF DESCRIPTION OF THE DRAWING

FIG. 1 shows a longitudinal section through an inventive actuator.

DETAILED DESCRIPTION

FIG. 1 shows an actuator 40, which includes a first spindle nut 10 and a second spindle nut 12. A threaded spindle 14 is screwed-in into the spindle nuts without clearance. The spindle nuts are disposed in a housing 32. The actuator further includes a first rolling-element bearing 16 and a second rolling-element bearing 18. The two rolling-element bearings are configured as deep groove ball bearings. The first rolling-element bearing 16 is disposed axially between the housing 32 and a part of the spindle nut 10, and specifically such that the housing 32 exerts a force on the outer ring of the rolling-element bearing 16 and the part of the spindle nut exerts a force on the inner ring of the rolling-element bearing 16, whereby a preloading of the bearing 16 is effected and simultaneously the spindle nut 10 is pressed away from the rolling-element bearing 16 in the axial direction against the threaded spindle 14. Furthermore the rolling-element bearing 18 is disposed in an analogous manner between the housing 32 and a part of the spindle nut 12 so that the housing exerts a force on the outer ring of the rolling-element bearing 18 in the axial direction, and the part of the spindle nut 12 exerts a force on the inner ring of the rolling-element bearing 18 in the axial direction away from the rolling-element bearing 16, and the inner ring of the rolling-element bearing 18 exerts a force on the spindle nut 12, which force presses the spindle nut 12 in the axial direction away from the rolling-element bearing 18 against the threaded spindle 14. Consequently the force that the spindle nut 10 exerts on the threaded spindle 14 and the force that the spindle nut 12 exerts on the threaded spindle 14 are directed parallel but opposing with regard to their direction, wherein the directions are each parallel to an axis of rotation of the threaded spindle 14. The spindle nuts 10, 12 further form a claw coupling 20 by which torques are transmitted between the spindle nuts. The rolling-element bearings support the spindle nuts rotatably with respect to the housing 32. Since the spindle nuts exert forces on the threaded spindle in opposite directions the axial clearance of the actuator is minimized. To operate the actuator it includes a drive (not shown), which cannot rotate the threaded spindle 14 relative to the housing, but rather can only effect a linear movement of a center of mass of the threaded spindle relative to the housing.

In an installed state the actuator 40 is part of an operating table or a treatment chair 100 and effects a longitudinal or lateral tilting of the operating table or of the treatment chair 100. In combination the threaded spindle 14 and the spindle nuts 10, 12 are self-locking. There is no additional brake for braking of the threaded spindle 14. The pitch of the thread of the threaded spindle 14 is relatively low. Since the threaded spindle 14 is self-locking, a clearance of a drive of the actuator 40 need not be considered for monitoring the axial clearance of the actuator 40.

Furthermore, the actuator includes a switch 22, a component 26 configured as a nut, and an actuating element 24 that is attached on the housing. Using the drive the threaded spindle is movable relative to the housing. The component 26 is screwed-on onto the threaded spindle and thereby connected thereto. If in a first operating mode the drive drives the threaded spindle long enough, then with the assistance of the actuating element the component 26 actuates the switch with the movement of the component 26 relative to the housing, during which the component 26 remains at rest relative to the threaded spindle. Here the component 26 moves a first region 38 of the actuating element, which in contrast to a second region 36 of the actuating element is movable relative to the housing, against the switch and thereby actuates it. Due to this actuating of the switch the drive is switched off, so that the threaded spindle comes to rest relative to the housing. After coming to rest, a first end 48 of the threaded spindle, which is characterized in that the spindle nut 10 is disposed between this end and the component 26, has a maximum extension position relative to the housing. The threaded spindle also thereby has a maximum extension position relative to the housing. A position of the component 26 relative to the threaded spindle is variable by screwing the component relative to the threaded spindle, whereby the maximum extension position of the threaded spindle relative to the housing is definable. The thread of the threaded spindle is provided with TufLok® at points at which the component 26 can be placed, which allows a manual screwing. The ends of the thread of the threaded spindle are deformed, whereby the component 26 is undetachable. The component 26 can be secured with Loctite® 222.

The switch is disposed in a receiving region 28 of a housing element 30 of the actuator and thereby protected. The region 36 of the actuating element is screwed onto the housing 32. In the present exemplary embodiment the actuating element is configured as a leaf spring. Furthermore the switch is integrated into a circuit board of the actuator, which circuit board is attached to the housing.

In addition, the actuator includes a further actuating element 44, a further component 46 configured as a nut, and a further switch 42 that interact to switch off the drive in an analogous manner as already described above for the actuating element 24, the switch 22, and the component 26, wherein the only difference here is the movement direction of the threaded spindle relative to the housing.

In addition, the components 26, 46 form mechanical stop elements that block a further relative movement of the threaded spindle relative to the housing 32 when the stops drive against the actuating elements or the housing 32, even if the drive were switched on.

The components 26, 46 need not be configured as nuts, but can be functionally configured otherwise, for example, each as a clamping ring.

In principle elements can be provided on the switches that delimit the deflection of the actuating elements and/or ensure that the actuating elements that are configured as leaf springs reliably return into their initial position.

It is important that the actuator has a compact design, since in particular a lack of space prevails in operating tables and treatment chairs.

In most applications wherein actuators are installed it is necessary for safety reasons to define the maximum extension positions of the threaded spindle relative to the housing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved actuators and methods for switching the actuator between on and off states.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Spindle nut
12 Spindle nut
14 Threaded spindle
16 Rolling-element bearing
18 Rolling-element bearing
20 Claw coupling
22 Switch
24 Actuating element
26 Component
28 Receiving region
30 Housing element
32 Housing
34 Part
36 Region
38 Region
40 Actuator
42 Switch
44 Actuating element
46 Component
48 End

What is claimed is:

1. An actuator comprising:
    a threaded spindle,
    a housing, the threaded spindle being movable relative to the housing,
    a switch,
    an actuating element configured to actuate the switch, the actuating element being monolithic and having a first region extending substantially perpendicular to said threaded spindle and being movable relative to the housing, and a component connected to the threaded spindle and configured to press the first region of the actuating element against the switch when the threaded spindle moves to a predetermined position relative to the housing, in which said component contacts said first region of said actuating element,
    wherein a second region of the actuating element is directly attached on the housing.

2. The actuator according to claim 1, wherein the component is connected to the threaded spindle such that a position of the component relative to the threaded spindle is variable and a maximum extension position of the threaded spindle relative to the housing is defined by the position of the component relative to the threaded spindle.

3. The actuator according to claim 1, wherein the component is a nut.

4. The actuator according to claim 1, wherein the switch is disposed in a receiving region of a housing element of the actuator.

5. The actuator according to claim 1, wherein the actuating element is a leaf spring.

6. The actuator according to claim 1, wherein a first portion of the actuating element is fixed relative to the housing and a second portion of the actuating element is movable relative to the housing.

7. The actuator according to claim 1, wherein a drive of the actuator is switchable-off by an actuating of the switch.

8. An operating table or treatment chair including an actuator according to claim 1.

9. A method for switching off a drive of the actuator according to claim 1 comprising:
moving the threaded spindle relative to the housing such that the component presses the actuating element against the switch.

10. The actuator according to claim 1,
wherein the threaded spindle passes through the housing and including a first spindle nut on the threaded spindle inside the housing and a second spindle nut on the threaded spindle inside the housing and a first rolling element bearing inside the housing supporting the first spindle nut relative to the housing and a second spindle nut inside the housing supporting the second spindle nut relative to the housing.

11. The actuator according to claim 10, wherein the switch is located inside the housing and wherein a portion of the actuator is exposed at an axial end of the housing.

12. The actuator according to claim 10,
wherein the housing includes at least one wall extending circumferentially around the threaded spindle, a first axial end wall, and a second axial end wall,
wherein the threaded spindle passes through the first axial end wall and through the second axial end wall,
wherein the first axial end wall overlies the switch, and
wherein a first end of the actuating element is connected to the housing,
and a second end of the actuating element extends between the switch and the first axial end wall.

13. The actuator according to claim 1,
wherein the housing includes at least one wall extending circumferentially around the threaded spindle, a first axial end wall, and a second axial end wall,
wherein the threaded spindle passes through the first axial end wall and through the second axial end wall,
wherein the first axial end wall overlies the switch, and
wherein a first end of the actuating element is connected to the housing and a second end of the actuating element extends between the switch and the first axial end wall.

14. An actuator comprising:
a threaded spindle,
a housing, the threaded spindle being movable relative to the housing,
a switch,
an actuating element configured to actuate the switch, the actuating element being monolithic and having a first region extending substantially perpendicular to said threaded spindle and being movable relative to the housing, and a component connected to the threaded spindle and configured to press the first region of the actuating element against the switch when the threaded spindle moves to a predetermined position relative to the housing, in which said component contacts said first region of said actuating element,
wherein a second region of the actuating element is attached on the housing and is fixed with respect to the housing.

* * * * *